United States Patent [19]
Beck et al.

[11] Patent Number: 5,814,139
[45] Date of Patent: Sep. 29, 1998

[54] BALLPOINT PEN PASTES WITH PHTHALOCYANINE PIGMENTS

[75] Inventors: Karin Heidrun Beck; Helmut Bellaire, both of Ludwigshafen; Erwin Czech, Biblis; Walter Kurtz, Bad Dürkheim, all of Germany

[73] Assignee: BASF Aktiengesellschaft, Ludwigshafen, Germany

[21] Appl. No.: 683,465

[22] Filed: Jul. 18, 1996

[30] Foreign Application Priority Data

Jul. 27, 1995 [DE] Germany .................. 195 27 372.9

[51] Int. Cl.⁶ .................................................... C09D 11/18
[52] U.S. Cl. ..................... 106/31.78; 106/31.28; 106/31.6; 106/31.65; 106/412; 106/460
[58] Field of Search ................. 106/20 R, 20 C, 106/23 R, 412, 31.6, 31.78, 31.65, 31.28, 410

[56] References Cited

U.S. PATENT DOCUMENTS

| 4,687,791 | 8/1987 | Miyajimja et al. ............... 523/161 |
| 5,281,268 | 1/1994 | Ide et al. ........................... 106/410 |
| 5,466,283 | 11/1995 | Kondo et al. ................... 106/25 R |
| 5,567,233 | 10/1996 | Beck et al. ...................... 106/460 |

FOREIGN PATENT DOCUMENTS

| 0 687 717 | 12/1995 | European Pat. Off. . |
| 1 519 138 | 2/1969 | Germany . |
| WO 83/01625 | 5/1983 | WIPO . |
| WO 84/00174 | 1/1984 | WIPO . |

*Primary Examiner*—Deborah Jones
*Attorney, Agent, or Firm*—Oblon, Spivak, McClelland, Maier & Neustadt, P.C.

[57] ABSTRACT

Ballpoint pen pastes comprising at least one phthalocyanine pigment and customary ballpoint pen paste resin and organic solvent as essential components and also, if desired, further customary additives, and the preparation thereof.

5 Claims, No Drawings

BALLPOINT PEN PASTES WITH PHTHALOCYANINE PIGMENTS

The present invention relates to novel ballpoint pen pastes comprising a phthalocyanine pigment and customary ballpoint pen paste resin and organic solvent as essential components and also, if desired, further customary additives.

This invention further relates to the preparation of these ballpoint pen pastes.

Ballpoint pen pastes are customarily solutions of dyes in high boiling solvents to which resins are added to improve the fastness properties and to set the required viscosity (typically from 7 to 20 Pa.s), and are essentially water-free.

However, these ballpoint pen pastes are not satisfactory in various respects. Their document fastness, in particular, frequently leaves something to be desired.

German Patent Application P 44 20 644.5 describes black ballpoint pen pastes which include magnetite particles and are document-fast.

It is an object of the present invention to provide further document-fast ballpoint pen pastes which have good application properties.

We have found that this object is achieved by the above-defined ballpoint pen pastes.

We have also found a process for preparing the ballpoint pen pastes, which comprises kneading a phthalocyanine pigment into resin in the presence of water, subsequently substantially removing the water by decanting, then grinding the cold pigment-resin preparation and dispersing it in the organic solvent used for the finished ballpoint pen paste while, if desired, adding further additives.

The phthalocyanine pigments in the ballpoint pen pastes of this invention typically have particle sizes of <1 μm, preferably from 50 to 500 nm, and particularly preferably from 50 to 100 nm. Their specific surface area (BET) is typically within the range from 10 to 50 m$^2$/g. The particle size is customarily determined from electron micrographs or by means of X-ray diffraction.

Suitable phthalocyanine pigments include not only metal-free phthalocyanine but preferably metal-containing phthalocyanines such as copper phthalocyanine, in particular β-copper phthalocyanine (C.I. Pigment Blue 15:3, also 15:4), which may include up to 10% of α-copper phthalocyanine, but is preferably present in the pure β-form.

The ballpoint pen pastes of this invention typically include from 3 to 30, in particular from 10 to 15, % by weight of phthalocyanine pigment.

A further essential constituent of the ballpoint pen pastes is the resin, which serves to set the desired viscosity, which is generally from 7 to 20 Pa.s, preferably from 8 to 15 Pa.s, particularly preferably from 10 to 13 Pa.s.

Any resin customary for such purposes can be used. Exemplary are in particular acidic phthalate resins, neutral aldehyde resins and neutral ketone resins, which are obtainable for example under the names of Phthalopal®NP (BASF), Kunstharze SK (Hüls), Laropal®A (BASF) and Alnovol®PN 320 (Hoechst).

Also suitable are for example mixtures of neutral resins which have polar groups such as hydroxyl groups and include from 33 to 66% by weight, based on the neutral resins, of acidic resins, preference in this case being given to those mixtures in which the neutral portion predominates.

The resin content of the ballpoint pen pastes of the invention is customarily from 15 to 45, preferably from 20 to 40, % by weight.

Organic solvents suitable for the ballpoint pen pastes of the invention are likewise compounds known for this purpose. Suitable are specifically:

- alcohols: eg. tridecanol, isotridecanol, in particular benzyl alcohol;
- ether alcohols: eg. glycol ethers such as 2-methoxy-, 2-ethoxy-, 2-propoxy-, 2-isopropoxy-, 2-butoxy-, in particular 2-phenoxy-ethanol("phenylglycol"), also 2- and 3-methoxy-, 2- and 3-ethoxy-, 2- and 3-propoxy-, 2- and 3-isopropoxy-, 2- and 3-butoxy- and 2- and 3-phenoxy-propanol;
- diethers: eg. 1,2-dimethoxy-, 1,2-diethoxy-, 1,2-dipropoxy-, 1,2-diisopropoxy-, 1,2-dibutoxy- and 1,2-diphenoxy-ethane, 1,2- and 1,3-dimethoxy-, 1,2- and 1,3-diethoxy-, 1,2- and 1,3-dipropoxy-, 1,2- and 1,3-diisopropoxy- and 1,2- and 1,3-diphenoxy-propane;
- aliphatic carboxylic acids such as in particular olein; ie., technical grade oleic acid which is formed in the acid hydrolysis of fats and which may contain small amounts of stearic acid, palmitic acid and other fatty acids;
- aromatic carboxylic esters: eg. di($C_4$–$C_{13}$-alkyl) esters of phthalic acid such as dibutyl, diisobutyl, di-sec-butyl, dipentyl, diisopentyl, dihexyl, diheptyl, in particular dioctyl, diisooctyl and bis(2-ethylhexyl), also dinonyl, diisononyl, didecyl, diisodecyl, diundecyl, didodecyl, ditridecyl and diisotridecyl phthalate;
- hydrocarbons: eg. $C_5$–$C_{30}$-chloroalkanes such as chloroeicosane and chlorotetracosane; $C_1$–$C_{20}$-alkanes with two phenyl substituents, such as diphenyldecane and diphenyltetradecane; di($C_1$–$C_{10}$-alkyl)naphthalenes such as diisopropylnaphthalene; partially hydrogenated terphenyls.

It is of course also possible to use mixtures of these solvents (eg. benzyl alcohol-phenylglycol mixtures).

Generally, the ballpoint pen pastes of the invention contain from 40 to 60, preferably from 45 to 55, % by weight of organic solvent.

Furthermore, the ballpoint pen pastes of the invention may include organic dyes or dye mixtures dissolved in organic solvent for achieving a desired hue (in particular blue, or else, for example, black and violet).

Examples of suitable dyes are mixtures of C.I. Solvent Violet 8, C.I. Solvent Blue 4 and C.I. Solvent Black 5, of C.I. Solvent Violet 8 and C.I. Solvent Blue 64, of C.I. Solvent Violet 8, C.I.

Solvent Blue 4 and C.I. Solvent Red 49 or mixtures of metanil yellow acid and crystal violet base.

Suitable additions of these dyes are advantageously from 1 to 20% by weight, based on the finished ballpoint pen paste.

The novel ballpoint pen pastes can be prepared with advantage by the process of the invention by first incorporating the pigment into the resin and, after a comminuting step, admixing the pigment-resin preparation obtained with the organic solvent.

An advantageous process for preparing particularly preferred ballpoint pen pastes including finely divided β-copper phthalocyanine is as follows:

The resin is first kneaded alone at elevated temperature (from about 80° to 120° C.) for about 10–15 min. Then water is added, generally in an amount of from about 80 to 150% by weight, preferably from 50 to 100% by weight, based on the amount of resin, followed over about 30 min, a little at a time, by crude copper phthalocyanine pigment which has been activated by dry grinding, preferably without salt as grinding aid, and which customarily has an α-copper phthalocyanine content of from 5 to 50%, but may also be up to 100% α-copper phthalocyanine.

To facilitate the dispersion of the pigment in the resin, it is also possible to add pigment dispersants, for example those based on salts of organic polyacids such as polyacrylic acid or maleic acid/olefin copolymers, preferably dissolved in water, customarily in an amount of from 0.1 to 2% by weight of pigment dispersant, based on the amount of pigment.

The outer walls of the kneading trough are then cooled with water down to about 50°–80° C. and kneading is continued for about 1–4 h. At this temperature, the viscosity of the resin is distinctly increased, giving rise to high shearing forces which effect an incorporation of the copper phthalocyanine pigment into the resin as finely divided β-copper phthalocyanine (α content generally ≦10%).

The water can thereafter be substantially removed by decanting.

Of course, this method can also be used to incorporate into the resin a copper phthalocyanine already in the β-form.

The pigment-resin preparation thus produced is then cooled down, broken into pieces and ground to an average particle size of from about 100 to 200 μm. A laboratory mill, for example, is suitable for this purpose.

If necessary, the mill base obtained can subsequently be after-dried in order that any water still remaining may be removed.

The ground preparation is then dispersed in organic solvents customary for ballpoint pen pastes with the addition, if desired, of further additives, especially, for example, the abovementioned dye solutions.

The blue ballpoint pen pastes of this invention are notable for advantageous application properties, especially document fastness and storage stability.

EXAMPLE 770 g of a commercial neutral aldehyde resin were kneaded for 15 min at a thermostat temperature of 115° C. in the 2.5 l kneading trough of an LUK 2.5 KSTV mixing and kneading machine from Werner & Pfleiderer (Stuttgart) with the slow kneading blade revolving at 50 rpm. The kneading trough was then half-filled with water (about 1 l), covering the kneading blades to a depth of about ⅘. After heating the water to the boil, 467 g of a crude copper phthalocyanine pigment activated by dry grinding without salt (α content 35%) were added a little at a time over 30 min, followed by 0.5 ml of a 10% strength by weight solution of the sodium salt of an anionic copolymer of maleic acid and an olefin (Sokalan®CP 11 in water. Following discontinuation of the thermostat heating and cooling the heating jacket to 65° C. kneading was continued at that temperature for a further 3.5 h. The water was then removed by decanting it off.

After cooling to room temperature, the preparation obtained was broken into pieces and ground in a laboratory mill for 2 min.

10 g of the preparation thus comminuted were then dispersed in 52 g of 1:1 w/w 2-phenoxyethanol/benzyl alcohol.

The finely divided dispersion (particle size <1 μm) was then additionally admixed with 5 g of olein, 5 g of 1,2-propylene glycol, 6 g of a mixture of 48% by weight of methanil yellow acid and 52% by weight of crystal violet base and 22 g of the neutral aldehyde resin.

The ballpoint pen paste obtained was storage-stable, document-fast and blue.

We claim:

1. A process for preparing an essentially water-free ballpoint pen paste consisting essentially of a β-copper phthalocyanine pigment with a particle size of <1 μm, a resin and an organic solvent, which comprises dry grinding a crude copper phthalocyanine pigment with an α-copper phthalocyanine content of 5 to 100%, to activate said pigment, kneading said pigment into the resin in the presence of water, while exposing said pigment to high shearing forces, thereby converting said pigment into finely divided β-copper phthalocyanine pigment, subsequently substantially removing the water by decanting, then grinding the cold pigment-resin preparation and dispersing it in the organic solvent.

2. The process of claim 1 wherein the phthalocyanine pigment has a particle size of 50 to 500 nm.

3. The process of claim 1 wherein the paste further comprising organic dyes.

4. The process of claim 1 wherein the paste has a viscosity of 7 to 20 Pa.s.

5. The process for preparing an essentially water-free ballpoint pen paste of claim 1 wherein the paste has a composition consisting essentially of 3–30 wt % of phthalocyanine pigment, 15–45% by weight of resin, and 40–60% by weight of organic solvent.

* * * * *